United States Patent
Joshi et al.

(10) Patent No.: US 8,078,547 B2
(45) Date of Patent: Dec. 13, 2011

(54) METHOD OF CALCULATING AND DISPLAYING PREMIUM FREIGHT COSTS

(75) Inventors: Sanjay K. Joshi, Woodlands, TX (US); Marko Dodig, Houston, TX (US); Dimitrios I. Sagias, Houston, TX (US); Sean K. Ritchie, Mars, PA (US); John A. Hertneky, Aliquippa, PA (US); Michael F. Burns, Sewickley, PA (US); Ronald Gadzinski, Moon Township, PA (US); Samuel W. Phipps, Moon Township, PA (US); Claire Wickham Rivoir, Sewickley, PA (US)

(73) Assignees: Bayer MaterialScience LLC, Pittsburgh, PA (US); Bayer Corporate and Business Services LLC, Pittsburgh, PA (US)

( * ) Notice: Subject to any disclaimer, the term of this patent is extended or adjusted under 35 U.S.C. 154(b) by 577 days.

(21) Appl. No.: 11/881,899

(22) Filed: Jul. 30, 2007

(65) Prior Publication Data

US 2009/0037348 A1 Feb. 5, 2009

(51) Int. Cl.
*G06Q 10/00* (2006.01)
*G06F 7/00* (2006.01)

(52) U.S. Cl. ......... 705/341; 705/1.1; 705/330; 705/333; 705/400; 705/30

(58) Field of Classification Search .............. 705/1, 400, 705/1.1, 7, 11, 330, 334, 335, 336, 7.11, 705/7.27, 7.35, 7.38
See application file for complete search history.

(56) References Cited

U.S. PATENT DOCUMENTS

| | | | |
|---|---|---|---|
| 7,212,991 B2 * | 5/2007 | Chowdhary | 705/26 |
| 7,647,233 B2 * | 1/2010 | Kadaba et al. | 705/1.1 |
| 2002/0019759 A1 * | 2/2002 | Arunapuram et al. | 705/7 |
| 2002/0194038 A1 * | 12/2002 | Sauser et al. | 705/5 |
| 2005/0027660 A1 * | 2/2005 | Leroux et al. | 705/400 |
| 2005/0055237 A1 * | 3/2005 | Schmidtberg et al. | 705/1 |

OTHER PUBLICATIONS

Caputo, A. C. et al. "A Framework for Analysing Long-Range Direct Shipping Logistics." 2005, Industrial Management + Data Systems, vol. 105, Issue 7; p. 876, 24 pgs.*

* cited by examiner

*Primary Examiner* — Fadey Jabr
*Assistant Examiner* — Michael Harrington
(74) *Attorney, Agent, or Firm* — Noland J. Cheung (57) ABSTRACT

Methods for calculating and displaying premium freight costs are provided. The methods comprise the steps of: A) selecting a time period of interest; B) selecting all shipments occurring within the selected time period and indexing the shipments into a list; C) for each shipment in the list, evaluating whether the shipment was delivered in the optimal mode, optimal source, and/or optimal carrier, and if a non-optimal mode, source or carrier was used, calculating premium freight cost; D) if the premium freight cost is not negative, adding the premium freight cost to a lane for the non-optimal mode; and E) displaying the premium freight cost by lane on a computer screen. Information for carrying out the methods of the present invention is contained in various databases containing shipment data and optimality tables.

28 Claims, 13 Drawing Sheets

| PF Dashboard ▷ | System Health ▷ | | | | | | | |
|---|---|---|---|---|---|---|---|---|
| PF Savings ($) | BU1 | BU2 | BU3 | BU4 | BU5 | BU6 | BU7 | TOTAL |
| JANUARY | 31,996 | 218,966 | 4,470 | 403,694 | 2,356,963 | 405,414 | 13,365 | 3,434,868 |
| FEBRUARY | 60,155 | 250,693 | 39,799 | 85,868 | 3,925,755 | 851,915 | 11,907 | 5,226,093 |
| MARCH | 10,354 | 245,929 | 26,221 | 432,020 | 1,896,206 | 157,733 | 18,181 | 2,786,645 |
| APRIL | 64,627 | 110,542 | 64,056 | 517,833 | 1,702,938 | 225,489 | 26,653 | 2,712,138 |
| MAY | 8,794 | 20,938 | 85,492 | 324,289 | 4,150,142 | 571,092 | 21,482 | 5,182,229 |
| JUNE | 48,952 | 59,375 | 110,203 | 646,078 | 2,884,512 | 147,975 | 7,206 | 3,904,301 |
| JULY | 67,049 | 36,313 | 123,054 | 316,442 | 3,739,139 | 512,966 | 10,262 | 4,805,223 |
| AUGUST | 57,251 | 160,991 | 137,336 | 211,795 | 2,907,297 | 402,141 | 8,264 | 3,885,075 |
| TOTAL Savings $ | 349,178 | 1,103,748 | 590,630 | 2,938,018 | 23,562,953 | 3,274,725 | 117,319 | 31,936,572 |
| TOTAL lbs | 20,947,126 | 651,261,293 | 1,906,903 | 786,272,175 | 255,202,979 | 11,587,781 | 1,896,037 | 1,729,074,294 |
| TOTAL $ | 1,140,152 | 30,446,465 | 127,496 | 61,911,071 | 8,334,929 | 526,201 | 77,965 | 102,564,280 |
| TOTAL PF $ | 66,129 | 2,773,673 | 9,307 | 5,819,641 | 966,852 | 29,467 | 9,980 | 9,675,048 |
| $/lb | 0.05443 | 0.04675 | 0.06686 | 0.07874 | 0.03266 | 0.04541 | 0.04112 | 0.05228 |
| PF $/lb | 0.00316 | 0.00426 | 0.00488 | 0.00740 | 0.00379 | 0.00254 | 0.00526 | 0.00447 |
| PF Ratio (%) | 5.8% | 9.1% | 7.3% | 9.4% | 11.6% | 5.6% | 12.8% | 8.8% |
| PF Costs ($) | BU1 | BU2 | BU3 | BU4 | BU5 | BU6 | BU7 | TOTAL |
| JANUARY | 86,388 | 744,486 | 8,940 | 1,453,297 | 3,064,052 | 972,993 | 40,095 | 6,370,251 |
| FEBRUARY | 162,417 | 852,358 | 79,598 | 309,124 | 5,103,482 | 2,044,596 | 35,755 | 8,587,297 |
| MARCH | 27,556 | 836,160 | 52,442 | 1,555,272 | 2,465,068 | 378,560 | 54,544 | 5,370,002 |
| APRIL | 174,493 | 375,841 | 128,112 | 1,864,198 | 2,213,819 | 541,174 | 79,960 | 5,377,598 |
| MAY | 23,745 | 71,189 | 170,984 | 1,167,441 | 5,395,186 | 1,370,621 | 64,445 | 8,263,610 |
| JUNE | 132,171 | 201,875 | 220,405 | 2,325,881 | 3,749,866 | 355,141 | 21,617 | 7,006,956 |
| JULY | 181,031 | 123,463 | 246,108 | 1,139,191 | 4,860,880 | 1,231,117 | 30,786 | 7,812,576 |
| AUGUST | 154,579 | 547,370 | 274,671 | 762,461 | 3,779,487 | 965,137 | 24,791 | 6,508,496 |
| TOTAL PF $ | 942,781 | 3,752,742 | 1,181,260 | 10,576,864 | 30,631,839 | 7,859,340 | 351,958 | 55,296,786 |

| PF Dashboard ▷ | System Health ▷ | | | | | | | | |
|---|---|---|---|---|---|---|---|---|---|
| Import Data | | | | | | | | | |
| Update Data | | | | | | | | | |
| GRP | RPP | PMATERIAL | PROD DESC | SHIP TO PARTY | SHIP TO NAME | SHIP TO CITY | SHIP FROM STATE | SHIP TO ZIP | PLANT USED | KNMT PLANT |
| BU1 | | 00123 | PROD 1 | CUST. CODE | CUST. NAME | CITY A | PA | 48051 | LOC1 | |
| BU2 | | 00456 | PROD 4 | CUST. CODE | CUST. NAME | CITY X | TN | 77002 | LOC3 | |

FIG.10

| PF Dashboard ▷ | System Health ▷ | |

IMPORT NEW DATA

DATA SUMMARY

| Week | Repository | Mode | Carrier | Source | Payment | Pounds | Freight | MissingCounts |
|---|---|---|---|---|---|---|---|---|
| 8/14/2006 | 190 | 8 | 107 | 75 | 1904 | | 10 | 42 |
| 8/7/2006 | 160 | 5 | 93 | 62 | 3716 | | 9 | 39 |
| 7/31/2006 | 192 | 8 | 119 | 65 | 1979 | | 10 | 42 |
| 7/24/2006 | 163 | 4 | 109 | 50 | 1732 | | 10 | 41 |
| 7/17/2006 | 176 | 11 | 108 | 57 | 1935 | | 9 | 38 |
| 7/10/2006 | 185 | 6 | 100 | 59 | 1799 | | 9 | 38 |
| 7/3/2006 | 190 | 4 | 120 | 66 | 1506 | | 9 | 34 |
| 6/26/2006 | 224 | 12 | 140 | 72 | 1928 | | 10 | 38 |
| 6/19/2006 | 323 | 19 | 187 | 117 | 2749 | | 10 | 38 |
| 6/12/2006 | 94 | 6 | 57 | 31 | 1108 | | 10 | 33 |
| 6/5/2006 | 203 | 7 | 135 | 61 | 2300 | | 10 | 37 |
| 5/29/2006 | 176 | 9 | 100 | 67 | 1766 | | 10 | 36 |
| 5/22/2006 | 202 | 14 | 116 | 72 | 2860 | | 9 | 35 |
| 5/15/2006 | 249 | 13 | 161 | 75 | 2194 | | 10 | 35 |
| 5/8/2006 | 248 | 8 | 147 | 93 | 1826 | | 10 | 35 |
| 5/1/2006 | 230 | 13 | 130 | 87 | 1878 | | 10 | 39 |
| 4/24/2006 | 240 | 12 | 149 | 79 | 1782 | | 10 | 37 |
| 4/17/2006 | 250 | 12 | 142 | 96 | 2055 | | 10 | 36 |
| 4/10/2006 | 208 | 10 | 117 | 81 | 1613 | | 10 | 36 |
| 4/3/2006 | 239 | 8 | 137 | 94 | 1801 | | 9 | 36 |

METHOD OF CALCULATING AND DISPLAYING PREMIUM FREIGHT COSTS

FIELD OF THE INVENTION

This invention relates to methods of calculating, evaluating and displaying freight costs over time for use with supply chain analysis.

BACKGROUND INFORMATION

Large business organizations with multiple products and plants or manufacturing facilities often struggle to optimize the manner in which they transport goods to customers. Such organizations generate very large amounts of data related to different ways and costs of getting products to customers over time. Because the amount of data is so large, it is difficult to analyze and difficult for managers to interpret, to determine if resources are being used efficiently and if costs can be reduced. What is needed is a method of calculating, evaluating and displaying freight costs in a manner that is easily accessible to decision makers within the business organization.

SUMMARY OF THE INVENTION

Accordingly, in one aspect the present invention provides a method for calculating and displaying premium freight costs, the method comprising the steps of
  providing a database containing shipment data comprising date, cost, weight, mode, origin and destination, and optionally data related to business unit, product, source, customer or carrier;
  providing a database containing a mode optimality table and optionally one or more optimality tables selected from the group consisting of source and carrier;
  A) selecting a time period of interest;
  B) selecting all shipments occurring within the selected time period and indexing the shipments into a list;
  C) for each shipment in the list, evaluating whether the shipment was delivered in the optimal mode, and if a non-optimal mode was used, calculating premium freight cost;
  D) if the premium freight cost is not negative, adding the premium freight cost to a lane for the non-optimal mode; and
  E) displaying the premium freight cost by lane on a computer screen.

In an additional aspect, the present invention provides a method for calculating and displaying premium freight costs, the method comprising the steps of
  providing a database containing shipment data comprising date, cost, weight, source, origin and destination, and optionally data related to business unit, product, mode, customer and/or carrier;
  providing a database containing a source optimality table and optionally one or more optimality tables selected from the group consisting of mode and carrier;
  A) selecting a time period of interest;
  B) selecting all shipments occurring within the selected time period and indexing the shipments into a list;
  C) for each shipment in the list, evaluating whether the shipment was delivered from the optimal source, and if a non-optimal source was used, calculating premium freight cost;
  D) if the premium freight cost is not negative, adding the premium freight cost to a lane for the non-optimal source; and
  E) displaying the premium freight cost by lane on a computer screen.

In yet an additional aspect, the present invention provides a method for calculating and displaying premium freight costs, the method comprising the steps of:
  providing a database containing shipment data comprising date, cost, weight, carrier, origin and destination, and optionally data related to business unit, product, mode, source or customer;
  providing a database containing a carrier optimality table and optionally one or more optimality tables selected from the group consisting of mode and source;
  A) selecting a time period of interest;
  B) selecting all shipments occurring within the selected time period and indexing the shipments into a list;
  C) for each shipment in the list, evaluating whether the shipment was delivered by the optimal carrier, and if a non-optimal carrier was used, calculating premium freight cost;
  D) if the premium freight cost is not negative, adding the premium freight cost to a lane for the non-optimal carrier; and
  E) displaying the premium freight cost by lane on a computer screen.

These and other aspects of the invention will be more readily apparent from the following figures, detailed description and appended claims.

BRIEF DESCRIPTION OF THE DRAWINGS

The invention is further illustrated by the following drawings in which:

FIG. 7 is an example of a display screen showing Savings and Costs monthly summary tables by business unit.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all sub-ranges subsumed therein.

As used herein, the term "premium freight" (PF) refers to freight costs that are above optimal levels. Premium freight costs are broken down on the basis of causality: 1) the mode of transportation, such as air, truck, rail, or barge (referred to herein as "mode"); 2) the source of the product being shipped (referred to herein as "source"); and 3) the carrier of the goods (referred to herein as "carrier").

Mode PF occurs when a transportation mode more expensive then the optimal mode of transportation is used. Source PF occurs when the product is shipped from a less cost-effective plant or warehouse to the customer. Carrier PF occurs when the product is shipped with a non-preferred carrier.

To accurately measure, analyze and reduce PF, the present invention provides a computer system and related methods, comprising a plurality of components. The first component comprises optimality tables. Optimal mode, source, and carrier tables are developed and stored in a database which is part of an enterprise resource planning system, and these tables are continually updated to reflect changes in optimality over time.

The optimal mode, source and carrier for a particular customer are determined in a variety of ways. For example, the types of transportation a customer can accommodate determine optimal mode. If the customer can receive rail cars, then rail would most likely be the preferred, and optimal, mode of transportation, since rail is less expensive as compared to truck or air. If rail is not used for a particular shipment when the customer can receive rail cars, then premium freight costs would occur.

Optimal source information is developed by the use of linear optimization analyses, a standard business practice for determining the best source of goods for a particular customer, based on the location of the warehouse or plant where the goods originate and the location of the customer. One skilled in the art of supply chain analysis is familiar with linear optimization techniques and can develop optimality tables for source.

Optimal carrier information is based on several factors, including, but not limited to, the total cost charged by the carrier, the reliability of the carrier, and the availability of the carrier for the particular shipment. It is often the case that for a particular shipment the premium freight cost is a negative value, e.g., the cost of using the carrier for that shipment is less than the historic optimal value. Negative premium freight information in any category (mode, source, carrier) can be used to update the optimality tables so that they reflect changes in optimality over time.

For the purposes of trending (analyzing trends in) the data, positive and negative premium freight costs are reported, summed and analyzed separately, so that the negative premium freight costs do not appear to mitigate the occurrence of positive premium freight costs. In this manner, positive premium freights costs can be monitored over time to reduce their occurrence, while the negative premium freight information can be used to update the optimality tables.

The second component of the system comprises software (such as Oracle or other database management software) that is set up to compute PF for all shipments that occurred in the desired time period, for example the previous week, or other time period of interest. Each shipment's optimality (by mode, source and carrier) in the time period of interest is verified through the optimality tables and PF charges are calculated. Once PF calculation is complete, all of the shipment's instances are transferred into lanes (further defined below), which are verbal descriptions of sub-optimality, and are used to identify PF occurrences and trends over time. In other words, several thousand shipments are filtered to tens of lanes, which make the analysis and trending much less cumbersome. The embodiment described herein uses one-week time intervals as the time period of interest, although other time periods can also be used.

Thus, as used herein, the term "lane" is defined as the sum of premium freight costs by time period, grouped by use of non-optimal mode, non-optimal source and/or non-optimal carrier, also optionally grouped by business unit and by start point and end point. Each time there is an occurrence of PF, a lane is created to verbally describe the nature of the occurrence. PF costs are summed by lane, by time period (such as a week). For example, all shipments made in a particular week where the wrong mode was used from point A to point B are summed, by business unit, under the lane called "wrong mode from A to B". In this example, the wrong mode may have been barge, or it may have been truck; all wrong modes from A to B, regardless of the nature of the suboptimal mode, are summed as described. One of the benefits of the present invention is that it provides users with an easily understandable verbal description of trends in large amounts of cost data over time periods of interest, e.g., weeks, months or years.

The system of the present invention comprises a third component, a display system. To further assist in the analysis and minimization of PF, a web-based display system is used, such as a system developed using Visual Basic.NET, a Microsoft product. The display system comprises a plurality of displays (i.e. views), each of which gives the user a specific view of the organization's shipment efficiency over time. A main view tracks significant key performance indicators (KPI), such as PF ratio (further described below), and trended values of all the PF categories, among others. Another view, a bar chart or "pareto" view, provides users with the highest cost lanes for a user-specified period of time. A system health view enables users to review the gaps in the dynamic optimality tables, such as new customer-material combinations in the source table. It also provides them with the ability to close those gaps. Other views are also provided, as indicated in the accompanying figures. This list is not meant to be limiting, and the views provided to users will depend on the needs of the users.

The following terms are used throughout and are labeled Key Performance Indicators (KPI), each defined as follows:
a) Efficiency Ratio (%): the percent ratio of PF in total freight (also referred to herein as "PF Ratio").
b) Premium Freight ($): the absolute value of PF.
c) PF—Annualized ($): PF in a year (52 weeks) based on the current week, 4-week, or YTD weekly-average value.
d) PF Savings—Annualized ($): PF Savings in a year based on the difference between the current week, 4-week, or YTD PF-Ratio with a predetermined base line. The base line is determined by making a point-in-time calculation of PF costs and an analysis of how much money could be saved based on optimality information available at that point in time. This provides a PF ratio at a historical point in time, which can then be compared to the current PF ratio to determine if savings have been realized.

e) Mode-PF ($): PF which occurred due to utilizing a non-optimal transportation mode. Modes are defined as barge, rail, truck or air.

f) Source-PF ($) PF caused by sending products to a customer from a non-optimal plant.

g) Carrier-PF ($): PF caused by using a non-optimal carrier provider.

e) Shipment Costs ($/lb): the cost per pound of current shipments.

f) Number of Shipments: the weekly number of shipments, or weekly average for longer time periods.

g) Shipment Weight (Lb): the weekly weight of all shipments, or weekly average for longer time periods.

h) Shipment Freight/Line Haul ($): the amount paid for all shipments, by week.

The above variables are calculated by the software calculation component and displayed in the display component.

Figure 1A:
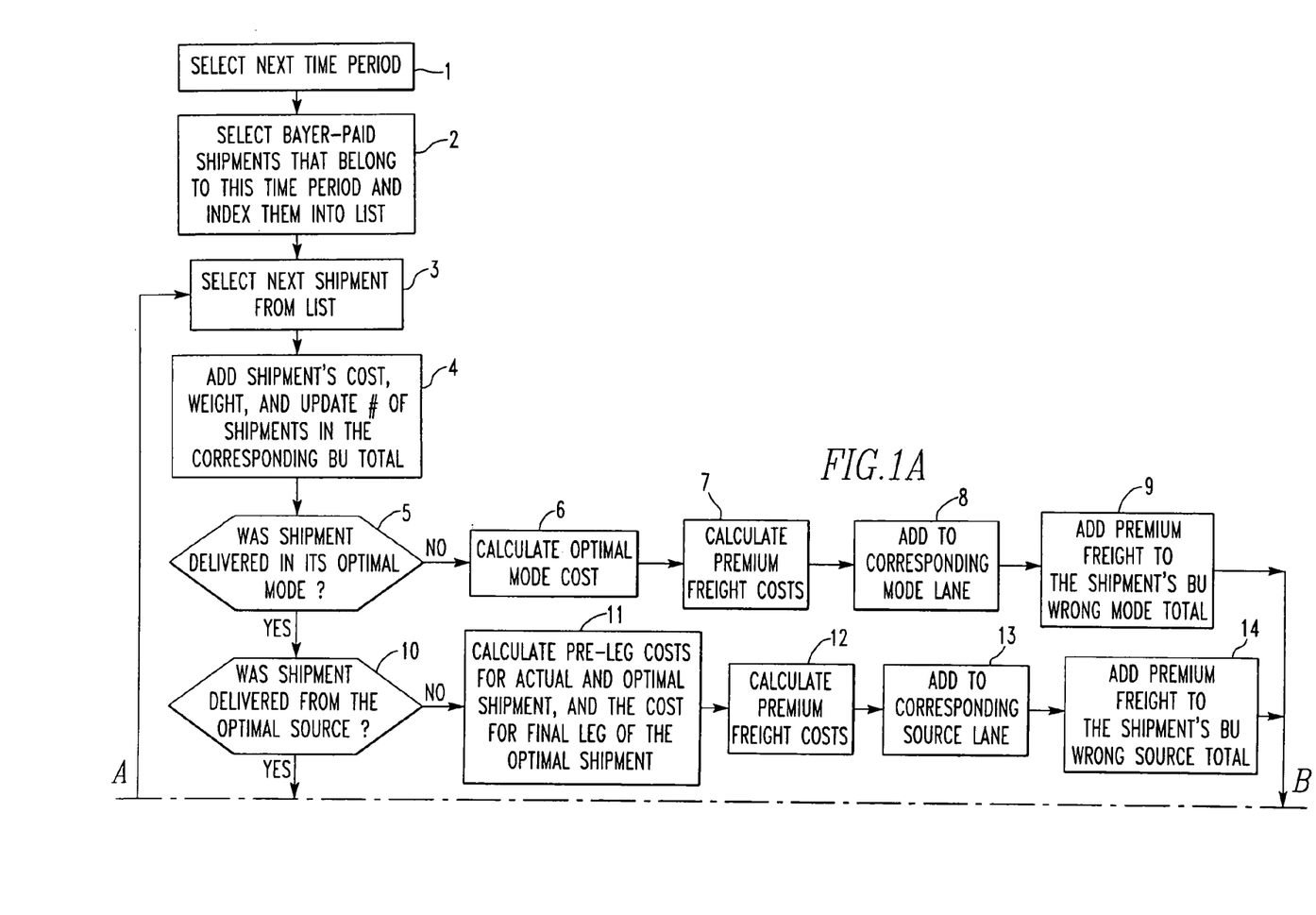
FIG. 1A is a flow chart illustrating the process of the present invention.
Figure 1B:
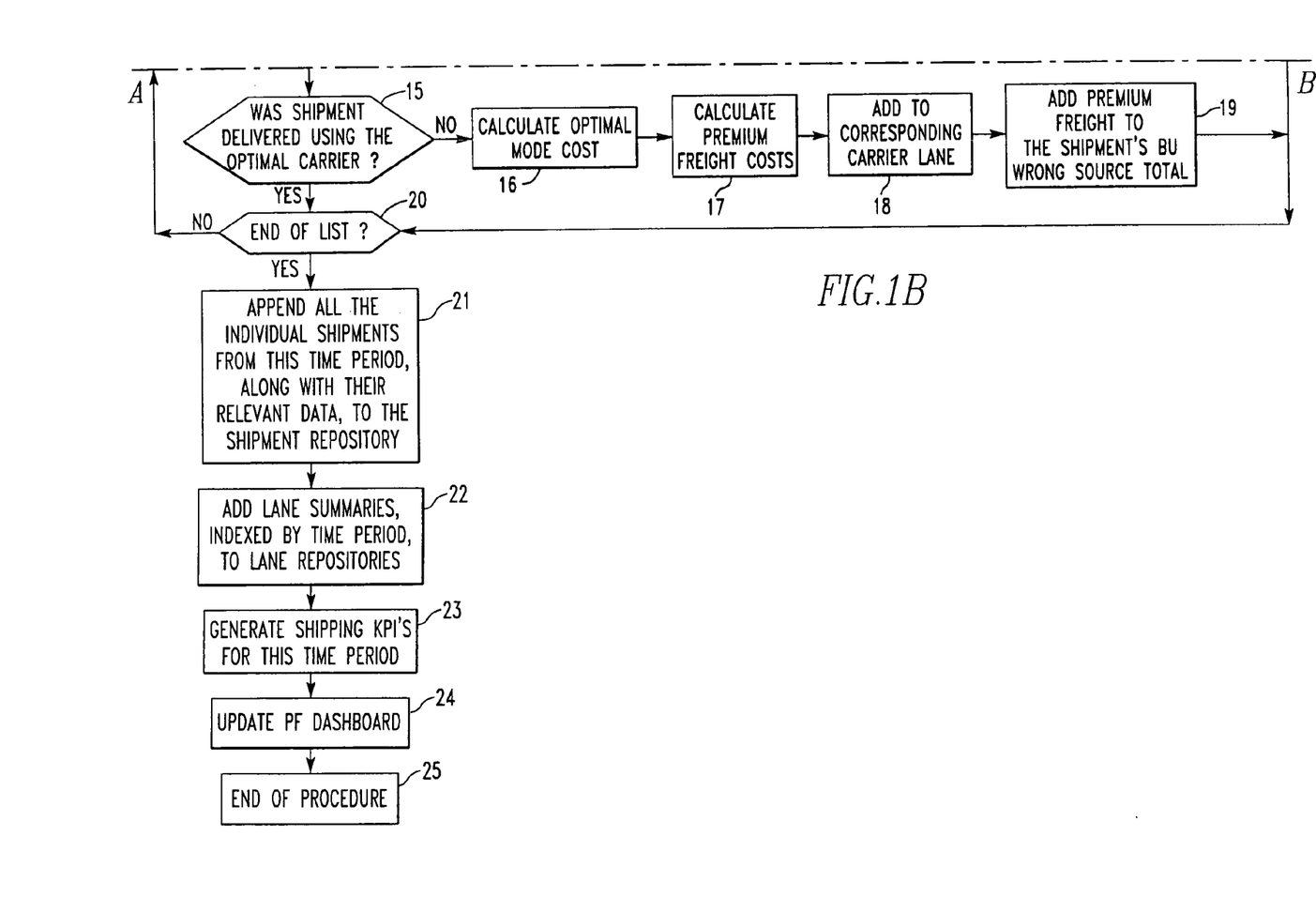
FIG. 1B is a flow chart illustrating the process of the present invention continued from FIG. 1A.

Referring to FIG. 1A and FIG. 1B, a process flow diagram illustrates an embodiment of the present invention. Alternative embodiments are also possible. A time period of interest is selected 1 and shipments belonging to the selected time period are indexed into a list 2. For each shipment in the list 3, the cost, weight, and shipment number are added to running totals for cost, weight and number of shipments 4. An evaluation of whether the shipment was delivered in the optimal mode is undertaken 5 by comparing the current mode of shipment to the lowest cost mode of shipment, which is stored in the mode optimality table. If optimal mode was not used, the optimal mode cost is calculated 6 and compared to the actual cost to determine the premium freight cost 7. The premium freight cost is added to the corresponding mode lane 8, and is also added to the running total for wrong mode by business unit 9. The next shipment in the list 3 is selected until the end of the list is reached 20.

If optimal mode is not used for a particular shipment, then optimal source and optimal carrier will not be evaluated for that particular shipment, since sub-optimality has already been detected at the mode level. For example, if a sub-optimal mode was used, the carrier will by definition be wrong, since a rail carrier would be different from a barge carrier. The same logic applies to source. Mode is evaluated first, because the mode of shipment is a greater determinant of, and a larger portion of cost, than are the other two categories, source and carrier.

If optimal mode was used, in a preferred embodiment an evaluation of whether the shipment was delivered from the optimal source is undertaken 10 by comparing the current source of shipment to the lowest cost source of shipment, which is stored in the source optimality table. If optimal source was not used, the optimal source cost is calculated 11 and compared to the actual cost to determine the premium freight cost. Premium freight costs are calculated 12 and added to the corresponding source lane 13. The premium freight costs are also added to the running total for wrong source by business unit 14. The next shipment in the list 3 is selected until the end of the list is reached 20.

If optimal mode and optimal source were used, then in a preferred embodiment an evaluation of whether the shipment was delivered by the optimal carrier is undertaken 15 by comparing the current carrier to the lowest cost carrier, which is stored in the carrier optimality table. If an optimal carrier was not used, the optimal carrier cost is calculated 16 and compared to the actual cost to determine the premium freight cost 17. The premium freight cost is added to the corresponding carrier lane 18. The premium freight costs are also added to the running total for wrong carrier by business unit 14. The next shipment in the list 3 is selected until the end of the list is reached 20.

After optimal mode and optionally source and carrier are evaluated, the shipment detail information is appended to a master table ("Shipment Repository") 21, lane summaries indexed by time period are added to helper tables ("Lane Repositories") 22, key performance indicators are calculated 23, and the display component is updated 24.

The software calculation component calculates premium freight cost totals by business unit, mode, source (if used), carrier (if used), product, and destination across all shipments in the selected time period, and also calculates one or more of the key performance indicators described above. The information from the premium freight cost totals and/or one or more key performance indicators is then displayed on a computer screen.

Master tables for mode, source and carrier can optionally be created to store detailed information (for the variables previously described) on all shipments in a given time period, including lane summaries. From this data the key performance indicators can be calculated. Helper tables can also be created to hold summary information, such as summaries by business unit or other variables of interest, to facilitate and speed display of summary information by a user.

Thus, in one aspect, the present invention provides a method for calculating and displaying premium freight costs, the method comprising the steps of:

providing a database containing shipment data comprising date, cost, weight, mode, origin and destination, and optionally data related to business unit, product, source, customer and/or carrier;

providing a database containing a mode optimality table and optionally one or more optimality tables selected from the group consisting of source, and carrier;

A) selecting a time period of interest;

B) selecting all shipments occurring within the selected time period and indexing the shipments into a list;

C) for each shipment in the list, evaluating whether the shipment was delivered in the optimal mode, and if a non-optimal mode was used, calculating premium freight cost;

D) if the premium freight cost is not negative, adding the premium freight cost to a lane for the non-optimal mode; and E) displaying the premium freight cost by lane on a computer screen.

The step of evaluating whether the shipment was delivered in the optimal mode is done by comparing the actual mode to the optimal mode, based on data contained in the mode optimality table. The premium freight cost of the shipment due to use of the non-optimal mode is calculated by subtracting the cost of a shipment using the optimal mode from the actual cost of the shipment. The cost, weight, and shipment number of each shipment are added to the total cost, total weight and total number of shipments, across all shipments in the selected time period, and optionally the cost, weight and shipment number are totaled by business unit, source, carrier, product, customer and/or destination, across all shipments in the selected time period.

Optionally, the method can further comprise the step of evaluating whether the shipment was delivered from the optimal source by comparing actual source to the optimal source, based on data contained in the source optimality table. If the optimal source was not used, the method further comprises the step of calculating the premium freight cost of the shipment due to use of a non-optimal source by subtracting the cost of a shipment using the optimal source from the actual cost of the shipment. If the source premium freight cost is not negative, the premium freight cost is added to a lane for the non-optimal source.

Also optionally, the method can further comprise the step of evaluating whether the shipment was delivered by the optimal carrier by comparing actual carrier to the optimal carrier, based on data contained in the carrier optimality table. If the optimal carrier was not used, the method further comprises the step of calculating the premium freight cost of the shipment due to use of a non-optimal carrier by subtracting the cost of a shipment using the optimal carrier from the actual cost of the shipment. If the carrier premium freight cost is not negative, the premium freight cost is added to a lane for the non-optimal carrier.

In additional embodiments, the method comprises the step of evaluating premium freight costs due to non-optimal source alone (without evaluation of mode or carrier), or evaluating premium freight costs due to nonoptimal carrier alone (without evaluation of mode or source).

In a preferred embodiment, the method further comprises the step of calculating one or more key performance indicators based on one or more of the totals described above, and displaying the one or more key performance indicators on a computer screen. The display of key performance indicators can include data on key performance trends over time. In preferred embodiments, the premium freight cost totals and/or key performance indicators are displayed by business unit, and average values for one or more key performance indicators and/or premium freight cost totals are displayed by weekly, monthly, year-to-date and/or annual periods.

As described previously, the optimality tables can be updated based on information obtained by analyzing negative premium freight costs, and views of one or more of the optimality tables can be displayed on a computer screen, to permit entry of missing values. Running totals for negative premium freight costs are maintained, each total being a sum of negative premium freight costs by mode, source or carrier.

Because optimality tables are rarely up to date in the average business environment, the ability of the present invention to accurately measure premium freight costs is improved by monitoring the percent of missing values in the tables, and devising methods for determining optimality in the absence of actual data. For example, it may not be known if a particular carrier is optimal, but an optimal carrier can be estimated, for example, by counting the number of times particular carriers are used, and designating the most frequently used carrier as optimal until actual data is obtained. Similar methods can be used to fill in other gaps in the optimality tables. As would be understood by one skilled in the art, if a great deal of data is missing from the optimality tables, the premium freight costs will not be accurately measured. Thus, an aspect of the present invention includes auxiliary programs which monitor missing values in the optimality tables and estimate optimal mode, source and/or carrier in the absence of actual data.

Figure 2:
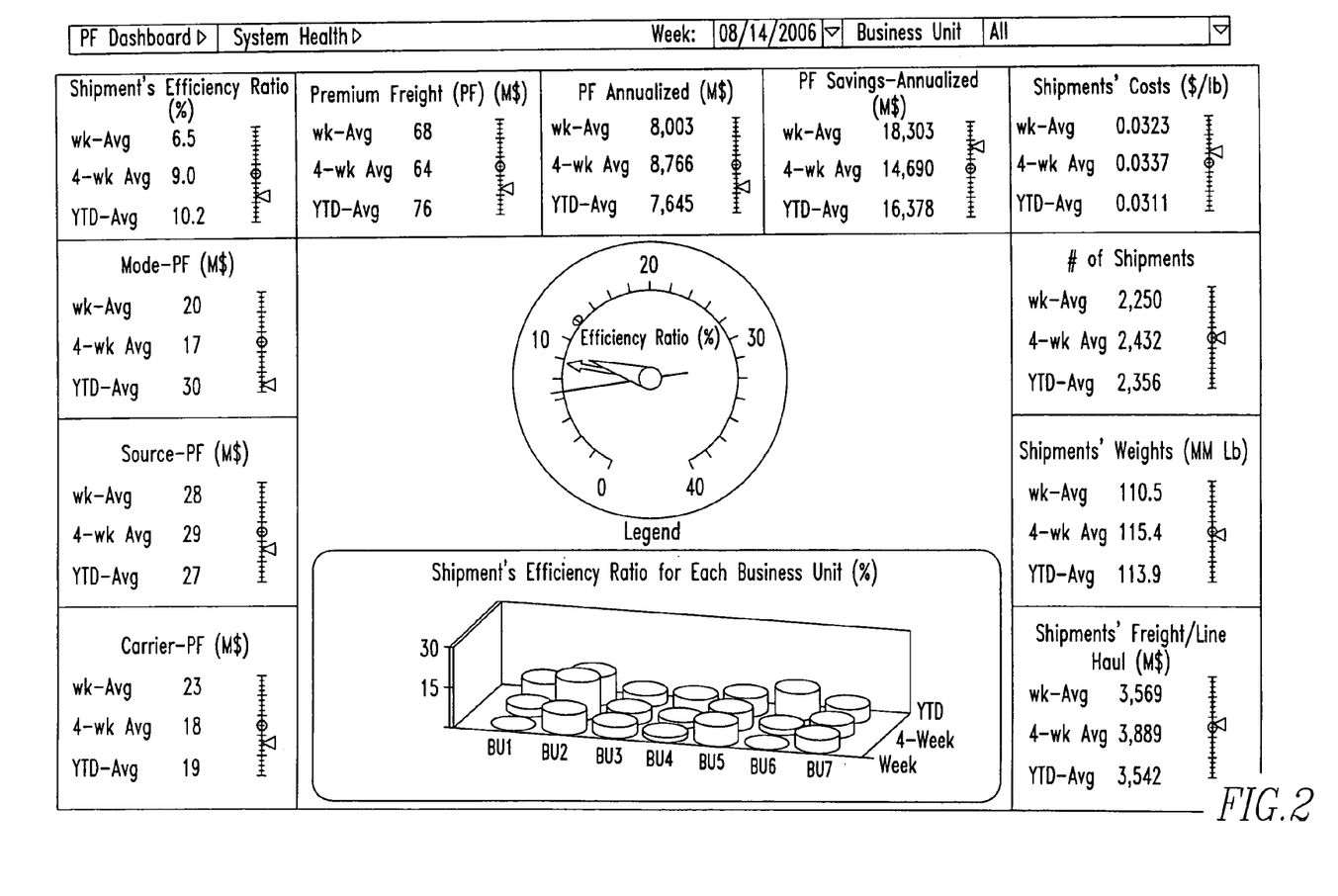
FIG. 2 is the main page in the user display system in an embodiment of the method of the present invention. The main page presents average values of several key performance indicators in a week, 4-week, and year-to-date (YTD) time duration. The user can choose a specific business unit and a particular week to display key performance indicators.

The main page in an embodiment of the display component of the present invention is shown in FIG. 2. Several key performance indicators are shown in this view, including efficiency ratio, PF by mode, source and carrier, total PF, annualized PF, and the like. In an embodiment of the present invention, KPI values are flagged (for example, by displaying the number or background in color) whenever the value exceeds the current year target (note: for Savings-Annualized KPI, values are flagged when below the target). The display can also include information on trends over time. In an embodiment of the present invention, shown in FIG. 2, the trend or value from the past 6-months or the beginning of the year (depending which one is the less recent) is displayed by holding the mouse down over the vertical line gauge.

The middle gauge in FIG. 2 shows the week, 4-week, and YTD average on different format. It can show the value of any KPI by clicking the title of a KPI. Also shown in FIG. 2 is a chart located at the lower middle part of the page which displays the PF-Ratio for each business unit for week, 4-week, and YTD average. A green bar shows that the value is below the current year target ratio, while a red bar shows that the value is higher than the current year target ratio. By hovering the mouse over a bar, the trend chart will be displayed.

Figure 3:
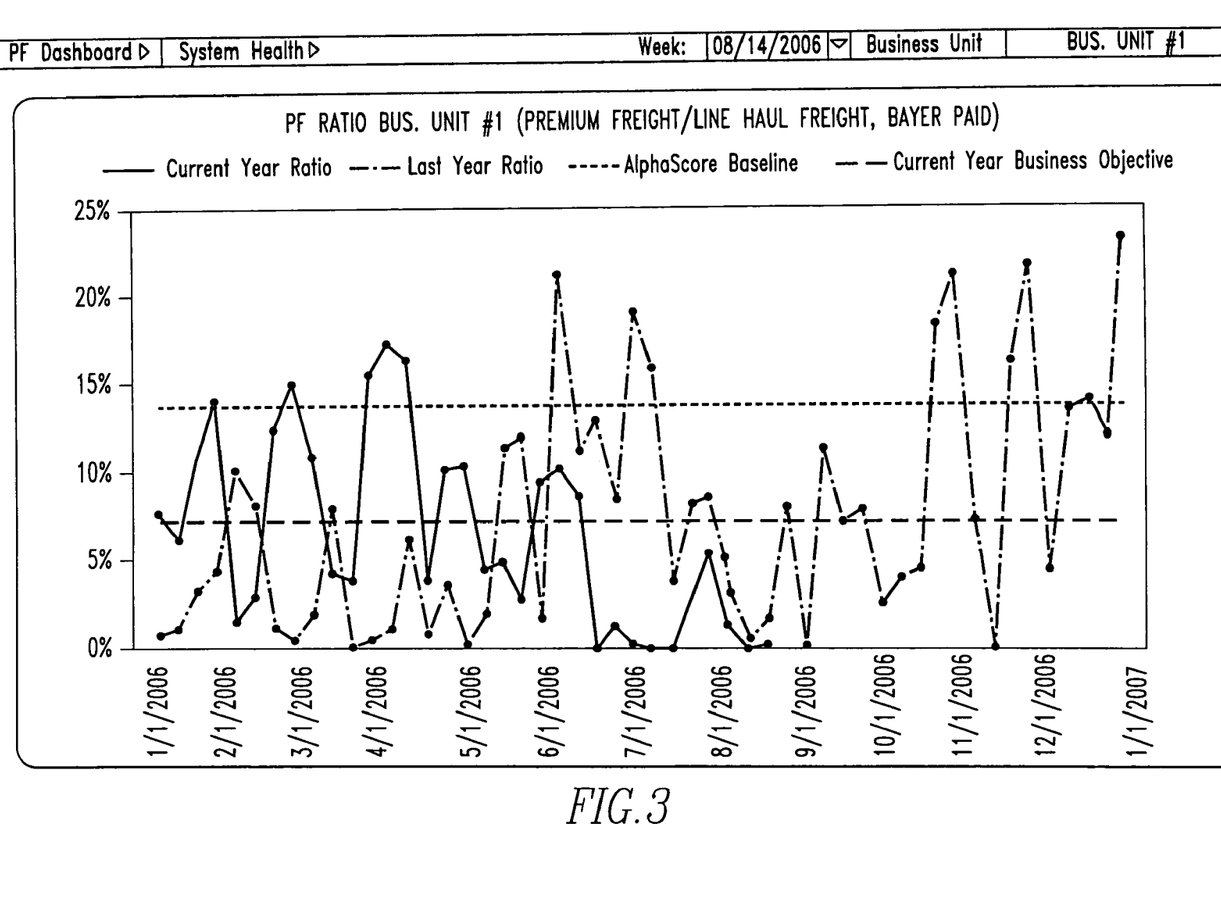
FIG. 3 is a trend graph of the efficiency ratio for the current year, the current year business objective, the previous year, and a predetermined baseline efficiency ratio.

FIG. 3 is a trend graph of the Efficiency Ratio (PF Ratio) for the business unit TDI, showing the current year, the current year business objective, the previous year, and a predetermined baseline efficiency ratio.

Figure 4:
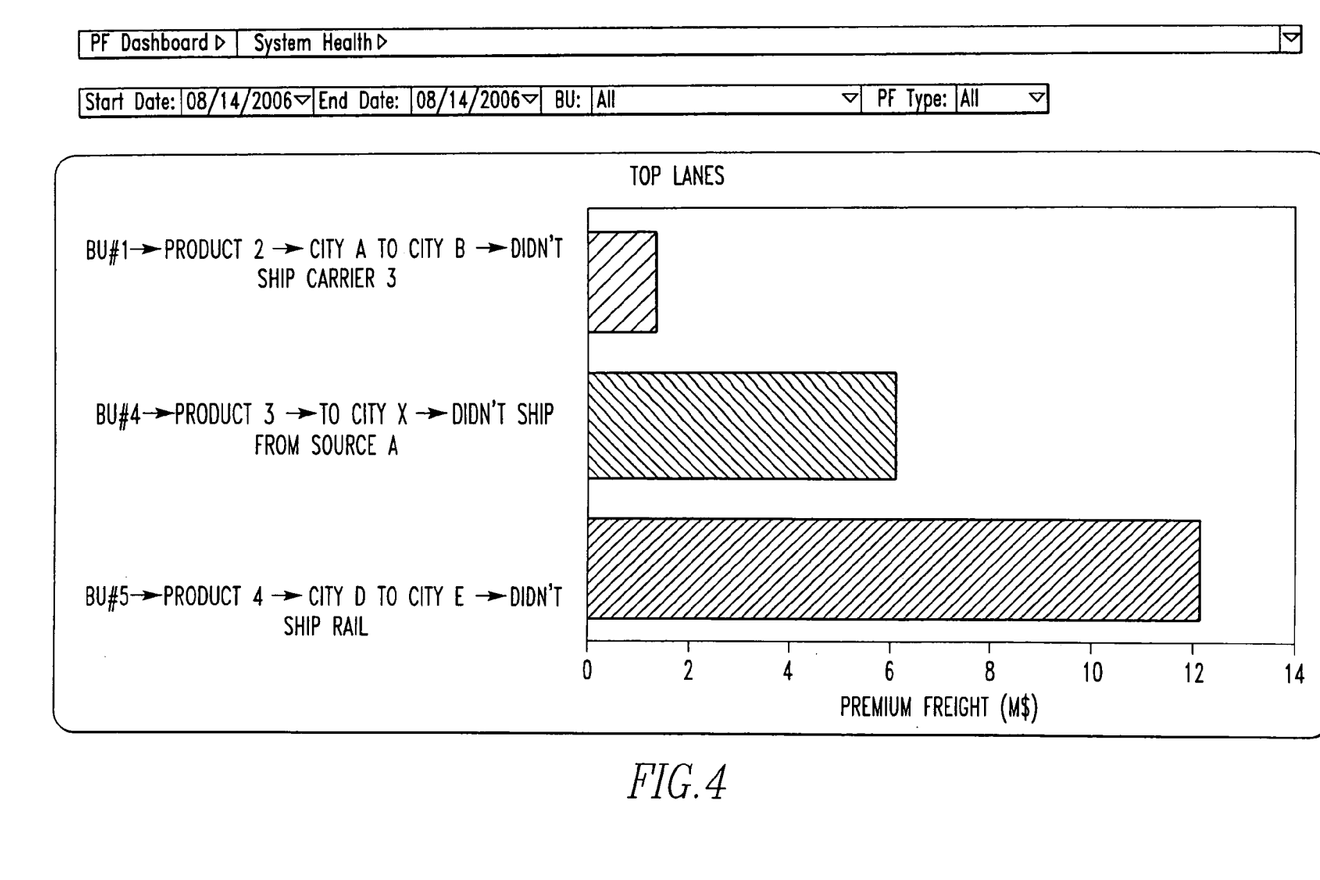
FIG. 4 is an example of a display screen showing the top ten lanes contributing premium freight. Amounts are based on time period, business unit, and premium freight type. Also displayed is a list of lane names for copying and pasting in further lane analysis.

FIG. 4 is a display screen showing the top ten lanes contributing to premium freight costs. Amounts are based on time period, business unit, and premium freight type. For example, the top lane shows the PF cost for the business unit PCS, for the product Sideline PC, for the shipment from Hebron, Ohio to Sheffield, Mass. The optimal carrier "didn't ship JEVC" is indicated. Also displayed is a list of lane names for copying and pasting in further lane analysis, such as in the view shown in FIG. 5.

Figure 5:
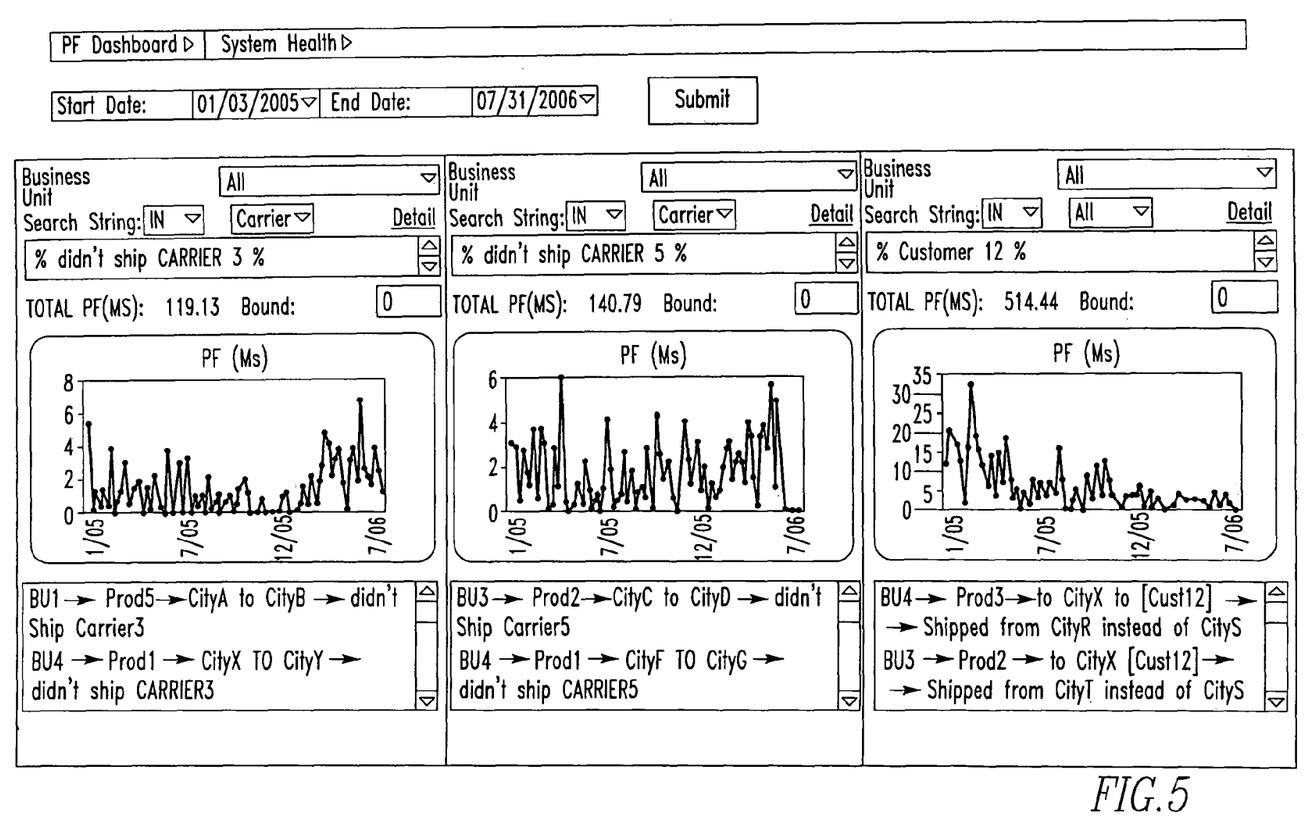
FIG. 5 is an example of a display screen which permits users to enter search strings, business unit name, time period of interest, or other variables for further lane analysis of premium freight costs.

FIG. 5 is an example of a display screen which permits users to enter search strings, business unit name, time period of interest, or other variables for further lane analysis of premium freight costs. For example, in the upper left-hand box of the view, the search string "% didn't ship MTRK %" is entered, and this string is used to search lanes across all business units by carrier. This search will retrieve all occurrences of PF across business units in which the PF is due to the use of the wrong carrier (the string is "IN" the lane). The data is displayed in a trend graph and in lane (verbal description) format. In another box, the bottom middle box of the view, all occurrences of PF for the customer "Electrolux Major Appliances" are displayed.

Figure 6:
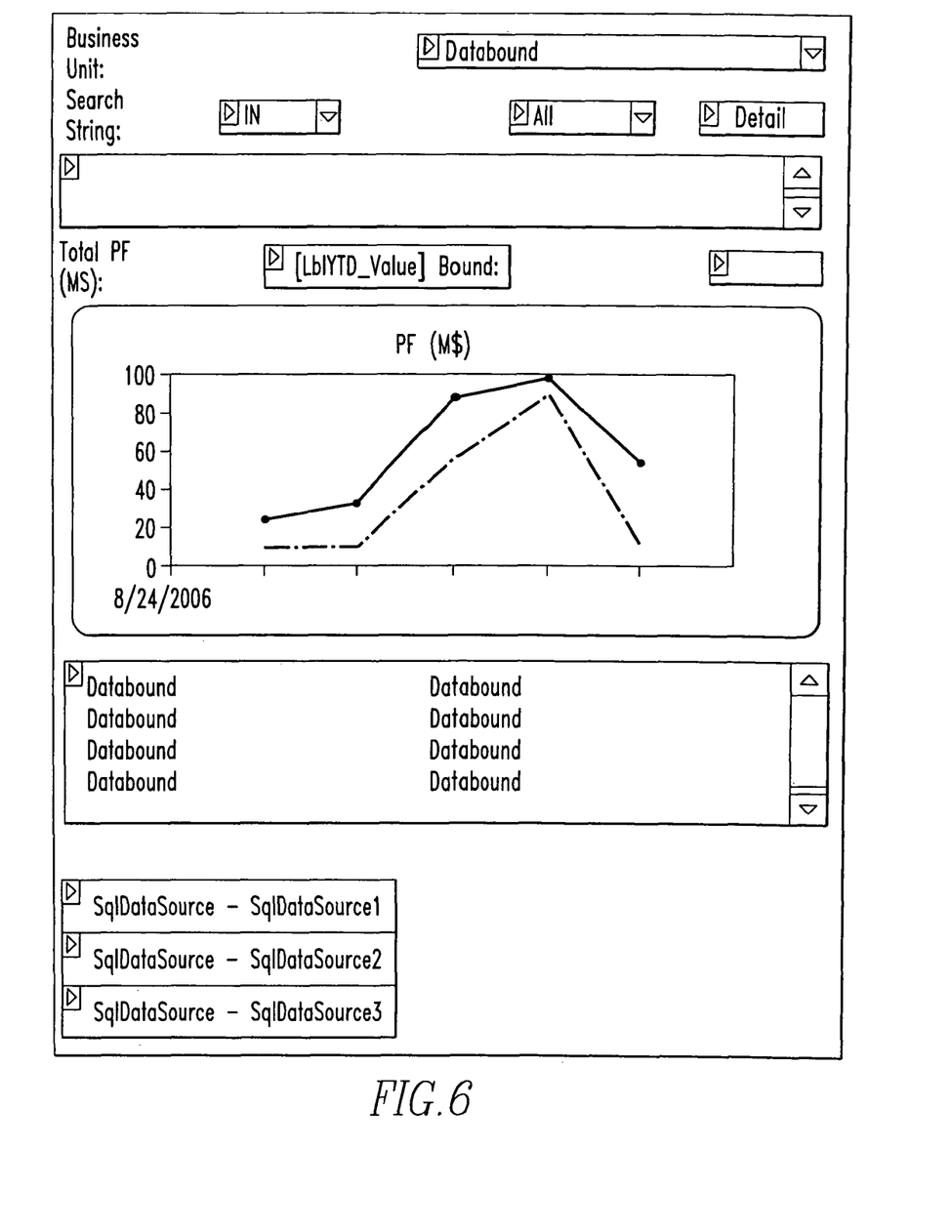
FIG. 6 is a detailed view of the user entry screen shown in FIG. 5.

FIG. 6 is a detailed view of the user entry screen shown in FIG. 5.

FIG. 7 is an example of a display screen showing Savings and Costs monthly summary tables by business unit.

Figure 8:
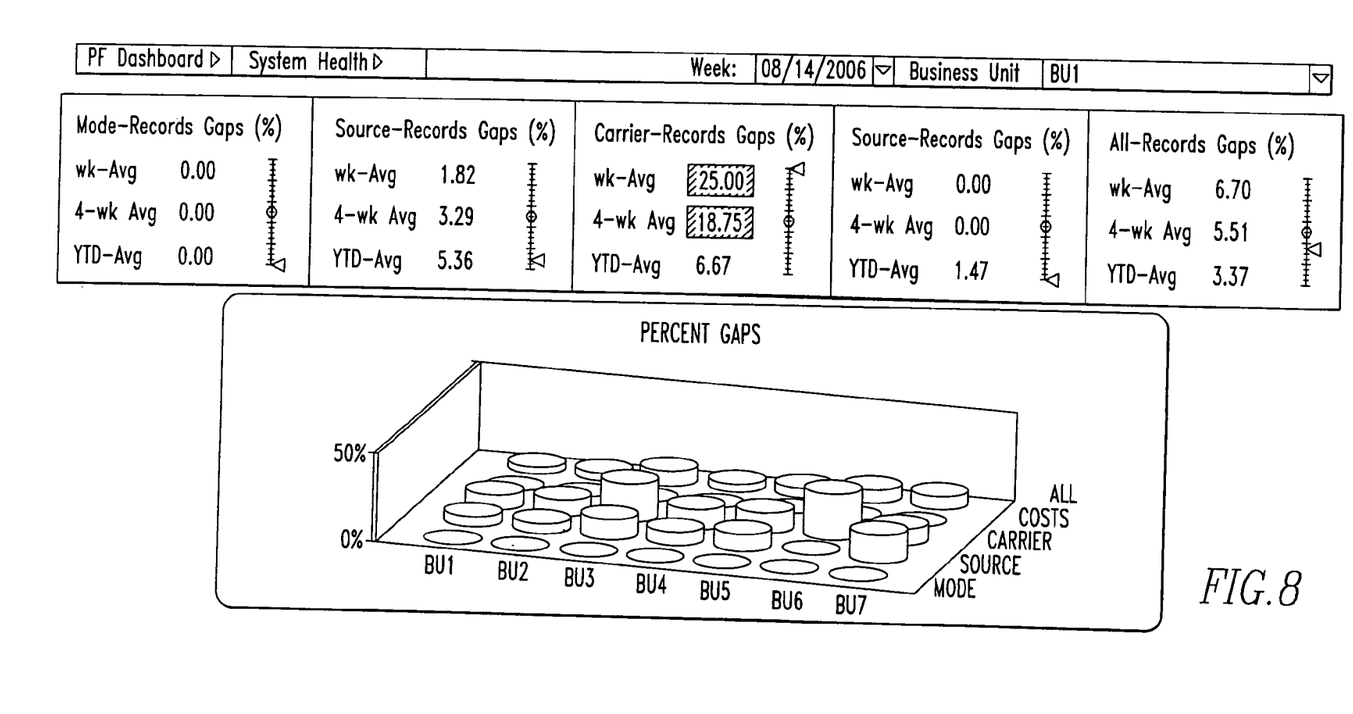
FIG. 8 is an example of a display screen showing system health, including the percent of record gaps by business unit, type of gap and trend over time.

FIG. 8 is an example of a display screen showing system health, including the percent of record gaps in optimality tables by business unit, type of gap and trend over time. This information is important in determining the accuracy of the premium freight cost information over time.

Figure 9:
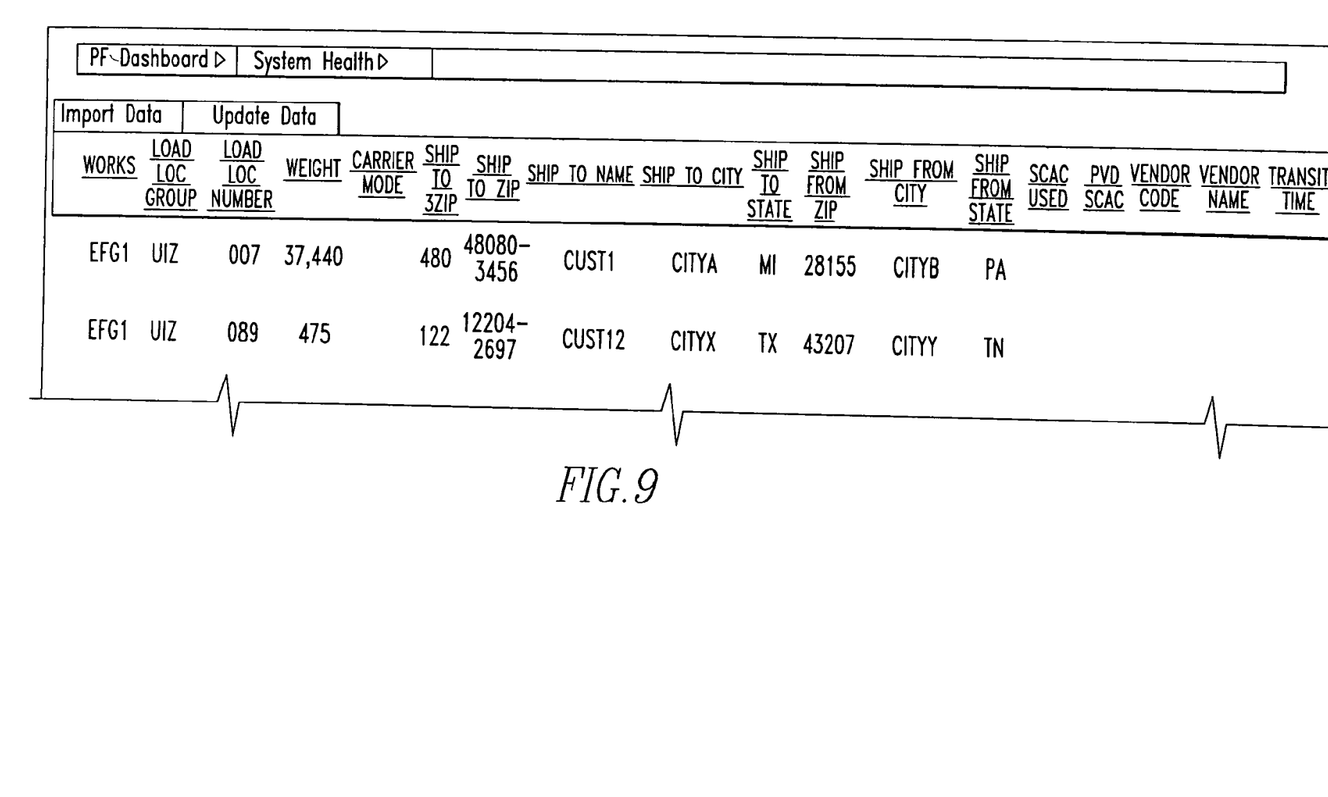
FIG. 9 is an example of a data entry screen that permits a user to fill in carrier data where gaps exist in the database.

FIG. 9 is an example of a data entry screen that permits a user to fill in carrier data where gaps exist in the database.

Figure 10:
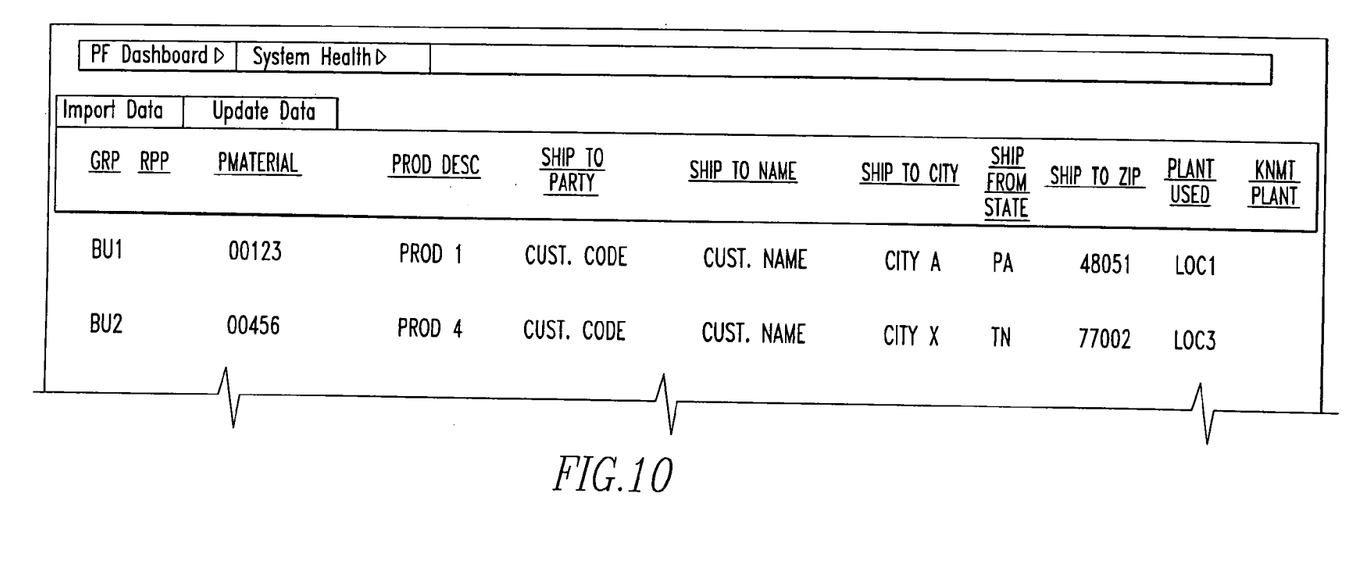
FIG. 10 is an example of a data entry screen that permits a user to fill in source data where gaps exist in the database.

FIG. 10 is an example of a data entry screen that permits a user to fill in source data where gaps exist in the database.

Figure 11:
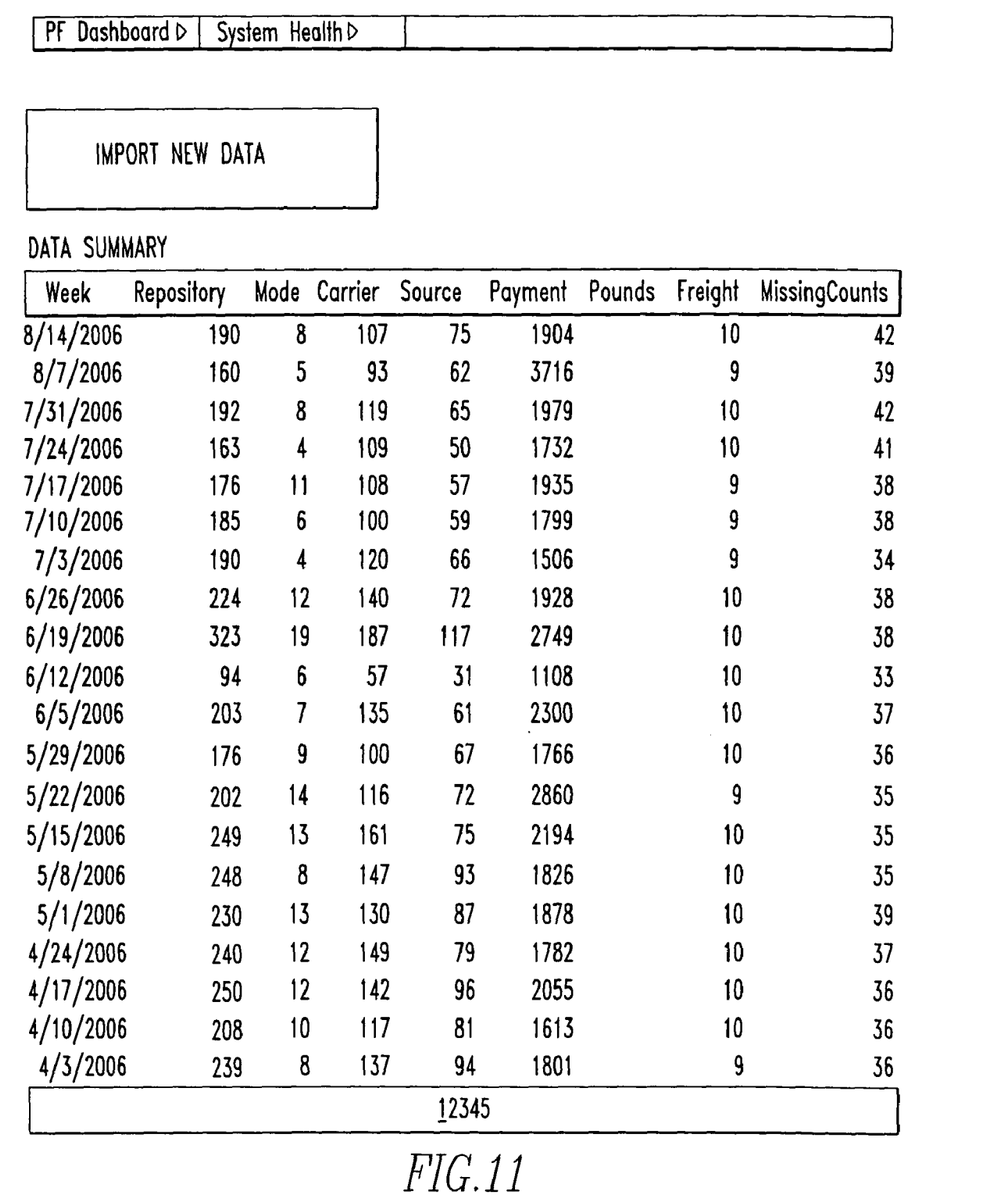
FIG. 11 is an example of a screen that permits administrators to import new data into one or more databases.

FIG. 11 is an example of a screen that permits administrators to import new data into one or more databases.

Figure 12:
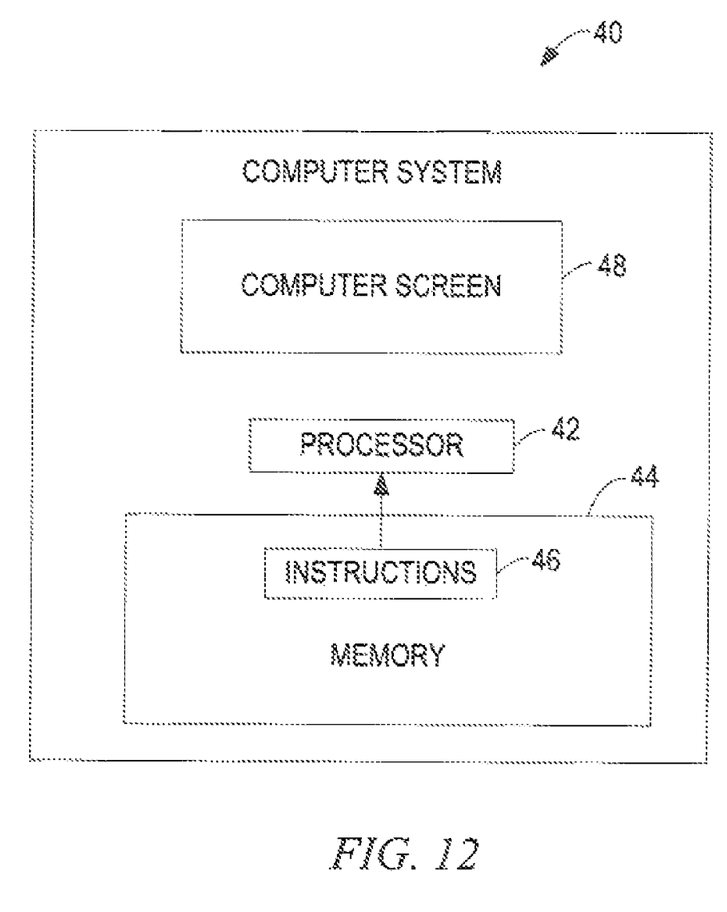
FIG. 12 is an example computer system in accordance with one non-limiting embodiment.

FIG. 12 is an example computer system 40 in accordance with one non-limiting embodiment. The computer system 40 may comprise one or more processors 42 and a memory 44. Software with instructions 46 to measure, analyze, and reduce PF may be stored on the memory 44 associated with the computer device. The processor 42 of the computer device may execute the software to measure, analyze, and reduce PF. The computer system 40 may further comprise a computer screen 48 for displaying PF information.

Whereas particular embodiments of this invention have been described above for purposes of illustration, it will be evident to those skilled in the art that numerous variations of the details of the present invention may be made without departing from the invention as defined in the appended claims.

What is claimed:

1. A method for calculating and displaying premium freight costs, the method comprising:
   providing a first database containing shipment data comprising date, cost, weight, mode, source, origin and destination;
   providing a second database containing at least one optimality table comprising data regarding at least a first shipping mode and a second shipping mode;
   receiving, by a computer system, a selection of a time period of interest;
   selecting, by the computer system, all shipments occurring within the selected time period and indexing the shipments into a list;
   for each shipment in the list, evaluating by the computer system whether the shipment was delivered in the optimal mode, when a non-optimal mode was used, calculating, by the computer system, a mode premium freight cost; and when the mode premium freight cost is not negative, adding, by the computer system, the mode premium freight cost to a lane for the non-optimal mode;
   for each shipment in the list delivered by the optimal mode, evaluating by the computer system whether the shipment was delivered from an optimal source by comparing actual source to the optimal source, when a non-optimal source was used, calculating, by the computer system, a source premium freight cost, and when the source premium freight cost is not negative, adding, by the computer system, the source premium freight cost to a lane for the non-optimal source; and
   displaying each of the mode premium freight cost and the source premium freight cost by lane on a computer screen.

2. The method of claim 1, wherein evaluating whether the shipment was delivered in the optimal mode comprises comparing the actual mode to the optimal mode, based on data contained in the mode optimality table.

3. The method of claim 1, wherein the premium freight cost of the shipment due to use of the non-optimal mode is calculated by subtracting the cost of a shipment using the optimal mode from the actual cost of the shipment.

4. The method of claim 1, wherein cost, weight, and shipment number of each shipment are added to the total cost, total weight and total number of shipments, across all shipments in the selected time period, and optionally the cost, weight and shipment number are totaled by at least one of business unit, source, carrier, customer, product, and destination, across all shipments in the selected time period.

5. The method of claim 4, further comprising calculating one or more key performance indicators based on one or more of the totals.

6. The method of claim 5, further comprising displaying the one or more key performance indicators on a computer screen.

7. The method of claim 5, wherein the one or more key performance indicators is selected from the group consisting of efficiency ratio; absolute value of at least one of the premium freight costs; at least one of the premium freight costs by week, month or year; at least one of the premium freight costs savings; total pounds shipped; cost per pound shipped; at least one of the premium freight costs by pound shipped; average weight of shipments; and at least one of the premium freight costs by at least one of the mode, the source, or a premium freight cost by carrier.

8. The method of claim 5, wherein the display of key performance indicators includes data on key performance trends over time.

9. The method of claim 5, wherein at least one of premium freight cost totals and key performance indicators are displayed by business unit.

10. The method of claim 5, wherein average values for one or more key performance indicators and at least one of the premium freight cost totals are displayed by at least one of weekly, monthly, year-to-date and annual periods.

11. The method of claim 1, wherein calculating the premium freight cost of the shipment due to use of a non-optimal source comprising subtracting the cost of a shipment using the optimal source from the actual cost of the shipment.

12. The method of claim 1, further comprising evaluating whether the shipment was delivered by the optimal carrier by comparing actual carrier to the optimal carrier, based on data contained in a carrier optimality table.

13. The method of claim 12, wherein when the optimal carrier was not used, the method further comprises calculating a carrier premium freight cost of the shipment due to use of a non-optimal carrier by subtracting the cost of a shipment using the optimal carrier from the actual cost of the shipment.

14. The method of claim 13, wherein when the carrier premium cost is not negative, the premium freight cost is added to a lane for the non-optimal carrier.

15. The method of claim 1, further comprising updating one or more of the optimality tables based on information obtained by analyzing negative premium freight costs.

16. The method of claim 1, wherein a view of one or more of the optimality tables is displayed on a computer screen, to permit entry of missing values.

17. The method of claim 1, wherein when at least one of the premium freight costs are a negative value, the at least one of premium freight costs are added to a total for negative premium freight costs, each total being a sum of negative premium freight costs by the mode, the source or a premium freight cost by carrier.

18. The method of claim 1, wherein two or more lanes are displayed in a bar chart view.

19. The method of claim 1, wherein the at least one lane is ranked in order of contribution to premium freight costs from highest to lowest, and a view showing trend information from the highest lanes contributing to premium freight costs is displayed on a computer screen, wherein the number of lanes selected for display is a number input by a user.

20. The method of claim 1, wherein the text of at least one of a mode lane, a source lane and a carrier lane is used to search among lanes, and the results of the search are displayed on a computer screen.

21. The method of claim 1, further comprising auxiliary programs which monitor missing values in the optimality tables and estimates an optimal mode, and at least one of source and carrier in the absence of actual data.

22. The method of claim 1, wherein the first database contains data related to at least one of business unit, product, source, customer and carrier.

23. The method of claim 1, wherein the second database contains one or more optimality tables selected from the group consisting of source and carrier.

24. A method for calculating and displaying premium freight costs, the method comprising:
   providing a first database containing shipment data comprising date, cost, weight, source, origin and destination;
   providing a second database containing a source optimality table comprising data regarding at least a first shipping mode and a second shipping mode;

receiving, by a computer system, a selection of a time period of interest;

selecting, by the computer system, all shipments occurring within the selected time period and indexing the shipments into a list;

for each shipment in the list, evaluating by the computer system whether the shipment was delivered from the optimal source, and when a non-optimal source was used, calculating, by the computer system, a source premium freight cost;

when the source premium freight cost is not negative, adding, by the computer system, the source premium freight cost to a lane for the non-optimal source;

for each shipment delivered from the optimal source, evaluating by the computer system whether the shipment was delivered by an optimal carrier, and when a non-optimal carrier was used, calculating, by the computer system, a carrier premium freight cost;

when the carrier premium freight cost is not negative, adding, by the computer system, the carrier premium freight cost to a lane for the non-optimal carrier;

displaying each of the source premium freight cost and the carrier premium freight cost by lane on a computer screen.

25. The method of claim 24, wherein evaluating whether the shipment was delivered by the optimal carrier comprises comparing actual carrier to the optimal carrier, based on data contained in a carrier optimality table.

26. The method of claim 24, wherein the first database contains data related to at least one of business unit, product, mode, customer and carrier.

27. The method of claim 24, wherein the second database contains one or more optimality tables selected from the group consisting of mode and carrier.

28. A system, comprising:

a first database containing shipment data comprising date, cost, weight, mode, origin and destination;

a second database containing a mode optimality table comprising data regarding at least a first shipping mode and a second shipping mode;

a computer screen;

a computer processor;

a computer readable medium having stored thereon instructions which, when executed by a processor, cause the processor to:

select all shipments occurring within a selected time period and index the shipments into a list;

for each shipment in the list, evaluate whether the shipment was delivered in the optimal mode, and when a non-optimal mode was used, calculating a mode premium freight cost;

when the mode premium freight cost is not negative, add the premium freight cost to a lane for the non-optimal mode; and for each shipment delivered from the optimal mode, evaluate whether the shipment was delivered from an optimal source, and when a non-optimal source was used, calculating a source premium freight cost;

when the source premium freight cost is not negative, adding the source premium freight cost to a lane for the non-optimal source;

display each of the mode premium freight cost and source premium freight cost by lane on the computer screen.

\* \* \* \* \*